Patented Aug. 5, 1930

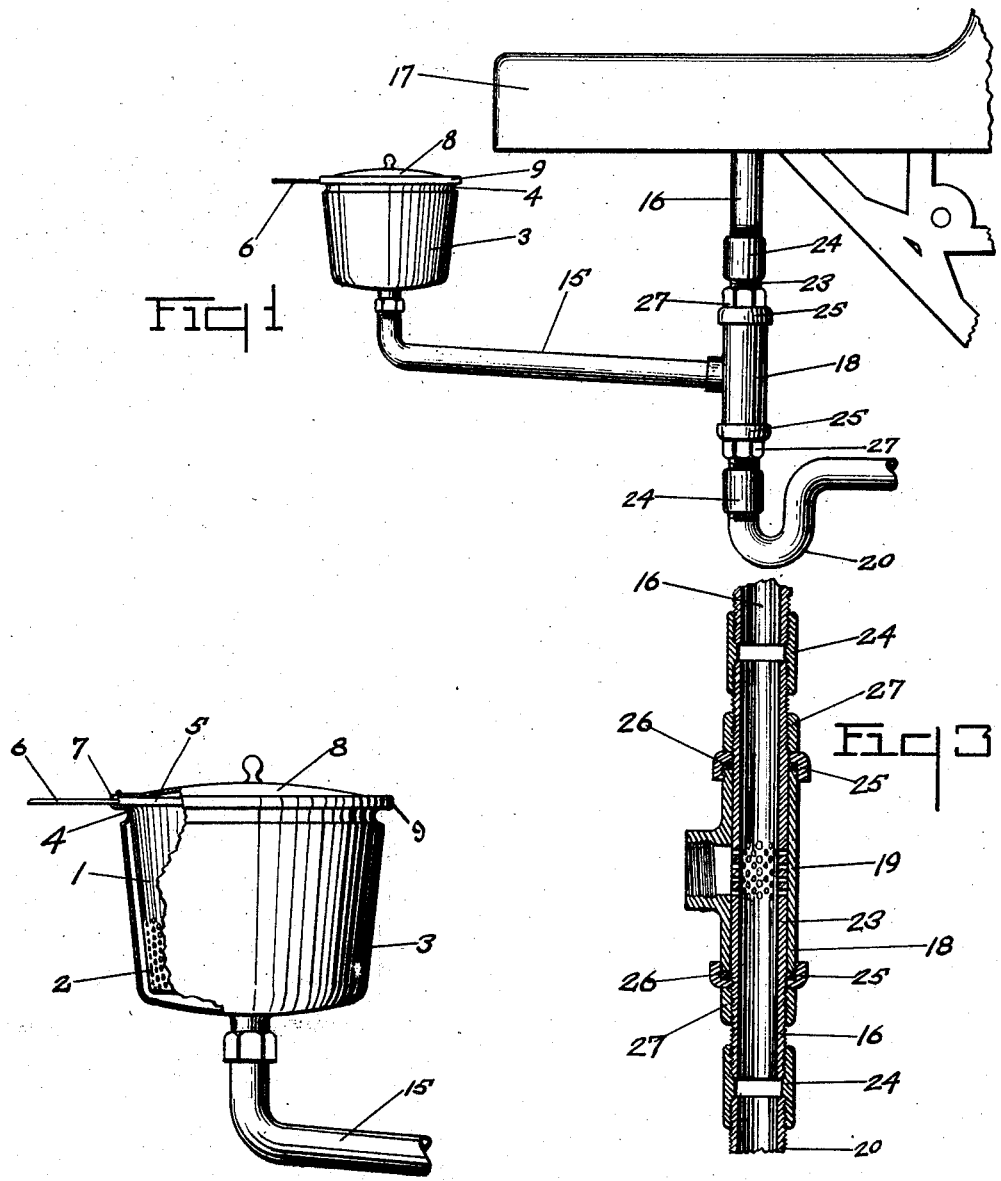

1,772,324

UNITED STATES PATENT OFFICE

FREDERICK A. ROBENS, OF TOLEDO, OHIO

KITCHEN UTENSIL

Application filed September 5, 1929. Serial No. 390,446.

My invention has for its object to provide an exceedingly convenient domestic utensil or instrument that may be used in a kitchen for containing garbage or refuse, previous to final disposal. The invention particularly provides a readily removable receptacle for receiving garbage or refuse and for draining off any water that may be disposed in the receptacle with the garbage into a drain pipe, such as the drain pipe of the sink in connection with which the instrument is used. The pipe connection may afford means also for supporting the receptacle and, if desired, for conveniently permitting the removal of the receptacle to one side, such as to a point under the sink.

The invention may be contained in utensils of different forms and used for different purposes. To illustrate a practical application of the invention, I have selected a garbage receiving utensil as an example of constructions embodying my invention and shall describe it hereinafter. The utensil selected for purposes of illustration is shown in the accompanying drawing.

Fig. 1 illustrates a side view of the utensil and shows its position with reference to a sink. Fig. 2 is an enlarged side view of a part of the utensil shown in Fig. 1. Fig. 3 is a view of a section of the drain pipe and a sleeve for connection to the receptacle shown in Fig. 2.

In the form of utensil shown in Figs. 1 to 3, a removable reticulated receptacle is supported in a container which is in turn supported on a swivelled pipe that communicates with the drain pipe of an ordinary kitchen sink. Thus the receptacle 1 has a reticulated bottom portion 2 and is supported in the container 3 for enclosing the receptacle 1 to prevent the escape of offensive garbage odors and to collect any liquids that may be disposed in the receptacle with the garbage or refuse. The container 3 is provided with an inverted bead 4 and the receptacle 1 is provided with a flange 5 adapted to rest on the top of the bead 4 when the container 3 is located within the receptacle 1. A handle 6 may be connected to the flange 5 so as to extend through an opening 7 formed in the upper edge of the container 3. A cover 8 may be placed on the flange 5 and within the upper edge 9 of the container 1 and so as to close both the receptacle 1 and the container 3.

The bottom of the container 3 is connected to a pipe 15 to carry off any of the liquids that may drain from the receptacle 1, to the drain pipe 16 of the sink 17. The pipe 15 is connected to a sleeve 18. The sleeve 18 is mounted on the pipe 16 which is provided with one or more openings 19 to permit the passage of liquids into the drain pipe 16. Preferably, the sleeve 18 is located above the trap 20 and, in order to seal the sleeve 18 as against the escape of the liquids that may pass to it from the pipe 15, the drain pipe 16 has a short length pipe 23 which is connected in the drain pipe 16 by the pipe connectors 24. A pair of packing rings 25 are threaded on opposite ends of the sleeve 18. The rings 25 are provided with fibrous packing material 26 for sealing the ends of the sleeve 18. A pair of nuts 27 are threaded on the ends of the pipe 23 to secure the sleeve 18 in a position to be rotated about the pipe 23. Thus, the receptacle 1 and its container 3 may be swung to points beneath the sink 17 or in front of the sink 17, so that it will be out of the way and yet may be positioned so that garbage or refuse may be readily disposed into the receptacle.

I claim:

In combination with a sink, a drain pipe and a trap, a container, a pipe connected to the lower part of the container, a sleeve communicating with the pipe and supported on the drain pipe for swivelled movements at a point between the sink and the trap, the drain pipe having a plurality of openings located in a portion of the drain pipe that is positioned in proximity to the end of the first named pipe for conveying the liquids from the first named pipe into the interior of the drain pipe at a point above the trap.

In witness whereof I have hereunto signed my name to this specification.

FREDERICK A. ROBENS.